United States Patent [19]

Sawusch

[11] Patent Number: 4,507,824
[45] Date of Patent: Apr. 2, 1985

[54] DEVICE FOR FILLETING BEHEADED FISH

[76] Inventor: Axel Sawusch, Pelzerstrasse 13, 2400 Lübeck, Fed. Rep. of Germany

[21] Appl. No.: 466,322

[22] Filed: Feb. 14, 1983

[30] Foreign Application Priority Data

Feb. 20, 1982 [DE] Fed. Rep. of Germany ....... 3206274

[51] Int. Cl.³ .................... A22C 25/08; A22C 25/16
[52] U.S. Cl. ........................................................ 17/61
[58] Field of Search ...................... 17/56, 58, 61, 55

[56] References Cited

U.S. PATENT DOCUMENTS

| 1,331,932 | 2/1920 | Kloster et al. | 17/58 |
| 1,384,877 | 7/1921 | Waugh | 17/58 |
| 1,471,567 | 10/1923 | Nicholson | 17/58 |
| 2,750,623 | 6/1956 | Baader | 17/56 X |
| 2,893,052 | 7/1959 | Schlichting | 17/56 X |

FOREIGN PATENT DOCUMENTS 1073779  6/1967  United Kingdom .................... 17/61

Primary Examiner—Willie G. Abercrombie
Attorney, Agent, or Firm—Edward F. Levy

[57] ABSTRACT

The invention concerns a device for filleting beheaded fish. Considering the deficiencies of known machines with regard to the aligning of the fish according to the position of the lower edge of their spinal column and with the purpose of removing these deficiencies at the same time using less expensive construction a transfer element is provided which can change its position directly due to the fish, which element is pivotal around the axis of a cutting tool opening the belly cavity and cutting free the belly spokes. First of all the cutting edges covered by the transfer element are set free, while the lower side of the spinal column is raised to the level of the bone guide following the cutting tool.

9 Claims, 3 Drawing Figures

DEVICE FOR FILLETING BEHEADED FISH

BACKGROUND OF THE INVENTION

1. Field of the Invention

The invention relates to a device for filleting beheaded fish which are fed to a filleting apparatus in their swimming position and includes at least one tool comprising at least one circular knife for cutting free the belly spokes or radii as well as guides for supporting the belly of the fish.

2. Prior Art

When filleting fish by means of the aforementioned device the fish to be filleted is normally placed onto a feeding conveyor either manually or automatically, the feeding conveyor performing the feeding into the filleting machine. In this context it is of great importance with regard to the quality of the product to be achieved as well as to the performance and the effectiveness of the working process that the fish are guided through the machine in a specifically determined position independent of the differing fish sizes. This concerns the level of its vertebral column as well as the alignment of its plane of symmetry. While the latter can be achieved via the outer contour of the fish by lateral supports and guides synchronised with respect to their central position, the level of the vertebral column can only be controlled by orientation of the vertebral column itself.

A filleting machine can be taken from German Pat. No. 1 063 784 in which the beheaded fish to be processed are pushed onto a spike with their cutting surface leading, a belly slitting knife entering into their lower sides. After passing a belly flap cutter the fish thus opened at its belly cavity reaches the working area of a bone cutter whose effective cutting edges are only set free after arrival of the belly cavity end in order to avoid a cutting into the vertebrae namely the lateral vertebral appendages of the spinal column.

With this device only species of fish whose belly cavities run bow-shaped to the anus in their upper boundaries so that the spike can glide along this upper boundary and leave the belly cavity without damaging the muscle flesh can be processed. Fish belonging to the Gadide species, e.g. cod, pollack, coalfish, haddock cannot be processed in this way since their belly cavities end in a bag-shaped part placed behind the anus. Furthermore it has been apparent that the processing of fish with an extremely short belly cavity, as can be found especially in fish with high backs, cannot be accomplished reliably since the effective cutting edges of the knives must be set free early enough so that the leading end of the vertebral column is not yet supported by the guides following the knives. Thereby a cutting into the lateral vertebral appendages resp. the vertebrae occurs which leads to friction between the fish and the conveyor due to the high cutting resistance and causes damage to the fish body. Finally, with respect to constructional necessities and the costs incurred it is a disadvantage that separate tools are provided to open the belly cavity and to cut free the belly radii, respectively, the tools also having to be controlled.

3. Object of the Invention

It is therefore the main and essential object of the invention to provide a filleting device which can be manufactured at low cost and used for processable fish species independent of the size of the fish.

SUMMARY OF THE INVENTION

This object is achieved according to the invention by a device for filleting beheaded fish fed to a filleting apparatus, which device includes at least one tool comprising at least one circular knife for cutting free the belly radii as well as guides for supporting the belly of the fish, a transfer element being associated with each circular knife of the tool for cutting free the belly radii, which element in its basic position covers at least an area of the cutting edges of these circular knives facing the arriving fish and which can be brought into a working position in the running direction of the fish by the latter which sets free the above mentioned area of the cutting edges, in which working position the guiding edges of the transfer elements lie flush with the supporting edges of the guides and follow these.

The advantages thus achieved consist especially in that merely an uncontrolled tool is to be provided for opening the belly cavity and cutting free the belly radii and that it is ensured that a cutting of the vertebrae namely the lateral vertebral appendages is avoided.

In an expedient arrangement each transfer element can be arranged pivotally about the axis of the respective circular knife and/or provided with means for guiding the transfer element from its working position into its basic position.

In order to improve the lateral centering of the fish the transfer elements can form a V-shaped passage with their opposing surfaces.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

DETAILED DESCRIPTION OF THE PREFERRED EMBODIMENT

Figure 1:
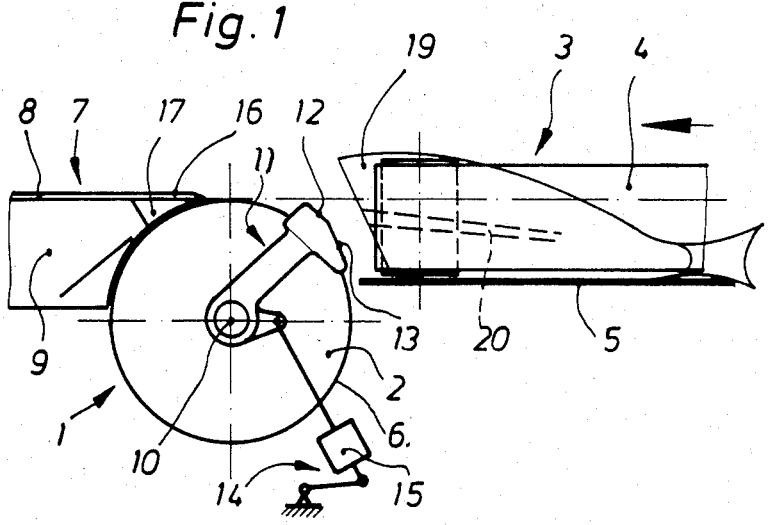
FIG. 1 shows a side view of the device before the arrival of a fish.
Figure 2:
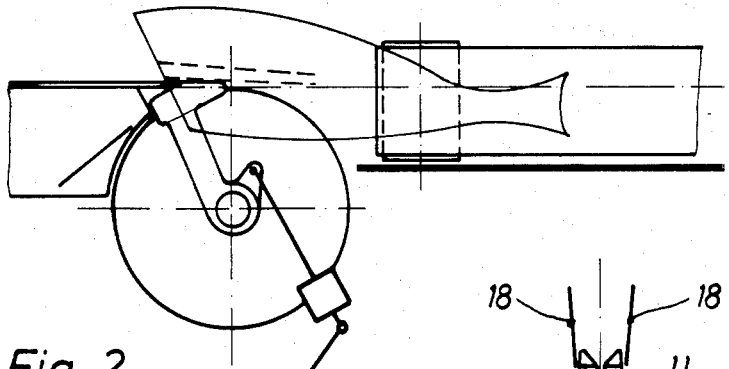
FIG. 2 shows a side view of the device after a fish has been fed to it.
Figure 3:
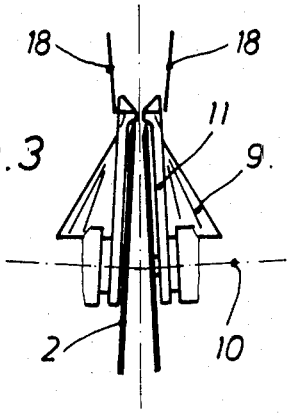
FIG. 3 shows a front view of the device in the leading direction with the transfer elements in an almost perpendicular intermediate position.

A cutting tool 1 comprising two rotatingly driven and mounted circular knives 2 lying interlaced with each other is arranged in a frame of a fish filleting machine, the frame not being shown in detail. A feeding device 3 comprising e.g. two transport belts 4 arranged in a V-shaped manner to each other and adapted to yield laterally synchronously, as well as a bottom plate 5 of metal sheet or a conveyor belt forming the floor is located in the flow direction of the fish, i.e. upstream of the cutting tool 1. The arrangement is such that the bottom of the feeding device lies at about the level of half the radius below the highest point of cutting edges 6 of the circular knives 2. A roof-shaped bone guide 7 extending a little beyond the highest point of the cutting edges 6 follows the circular knives 2 symmetrically to their plane of symmetry. This bone guide 7 comprises two metal sheet plates 9 which follow immediately the periphery of the circular knives 2, develop into a flatter roof inclination and form supporting edges 8 at their top leaving a gap between them. A transfer element 11 is arranged to swivel around an axis 10 of each circular knife 2, which element has a guiding edge 12 extending beyond the cutting edge 6 of the respective circular knife 2 and a run-in or entering edge 13 leading almost tangentially to the cutting edge 6. With their opposing surfaces the two transfer elements 11 facing each other form a V-shaped passage in which the cutting edges 6 are fully covered. The transfer elements 11 are coupled with each other by synchronising means 14 and held in a basic position by means of a weight 15. Pockets 17 formed in the plates 9 form a stop in a working position, the pockets 17 being so positioned in the area of a front end 16 of the bone guide 7 that each run-in edge 13 of the guiding edge 12 of each transfer element 11 lies flush with the corresponding supporting edge 8. Guides 18 which can expand against spring force and are synchronised centrally take over the central guiding of the fish 19 in the region of the cutting tool 1.

The operation of the device is as follows:

A fish 19 placed by hand or automatically into the feeding device 3 is guided by means of the transport belts 4 to the cutting tool 1. The bottom plate 5 supporting the fish by its belly is so arranged that the vertebral column 20 of the largest fish to be processed comes to lie with its lower edge below the level of the highest point of the cutting edges 6 of the circular knives 2. On reaching the cutting tool 1 the fish runs centered through the lateral guides 18 with the beheading surface against the run-in edge 13 of the transfer element 11 held in its basic position by the weight 15, without an incision occurring by the circular knife 2. In the course of the further forward conveying of the fish which can be carried out by a not-shown flank conveyor the transfer element 11 is carried along by the fish 19 against the force of the weight 15 and swings anticlockwise. This pivoting movement of the transfer element 11 thus exposes the portions of the cutting edges of the circular knives 2 facing the fish, and these exposed cutting edges begin to open the belly cavity. Simultaneously the transfer element 11 penetrates the latter so that the spinal column 20 of the fish 19 is raised supported at its bottom side until it has reached the level of the bone guide 7 which is the case when each transfer element 11 has found its stop in the pockets 17 in the end of the bone guide 7. In this position the run-in edges 13 have reached the level of the supporting edges 8 and lie flush with these. In the course of the swivelling all cutting areas lying underneath the highest point of the cutting edges 6 have been set free gradually so that the fish is opened at its belly without any incision in the vertebrae resp. vertebral appendages and is incised on both sides of the belly spokes exactly up to the vertebral column.

The fish 19 thus aligned with regard to the position of the lower edge of the spinal column 20 and independent of the height of its back is then fed to any further processing tools of the fish filleting machine riding on the supporting edges 8 of the bone guide 7.

What is claimed is:

1. A device for filleting beheaded fish having belly spokes and led to a filleting apparatus in a moving direction and in their swimming position with their beheaded end leading and belly downward, said device comprising
   (a) tool means including circular knive means having cutting edge means for cutting free said belly spokes,
   (b) guide means for supporting said belly of said fish via supporting edges,
   (c) transfer element means associated with said circular knife means and including guiding edge means, said transfer element means being mounted for movement between a basic position covering at least an area of said cutting edge means facing said fish at its arrival, to a working position in said moving direction of said fish to set free said area of said cutting edge means, in which working position said guiding edges of said transfer element lie flush with said supporting edges of said guide means as a continuation thereof, and
   (d) surface means on said transfer element means located in said basic position to be engaged by the beheaded end of said fish travelling in said moving direction, whereby said fish moves said transfer element to its working position with said circular knife means opening the belly cavity of the fish and the transfer element means penetrating the belly cavity and engaging and raising the spinal column of the fish to the level of said supporting edges.

2. A device as claimed in claim 1, wherein said transfer element means are arranged pivotally about an axis of said respective circular knife means.

3. A device as claimed in claim 1, wherein said device comprises means for guiding said transfer element means from said working position to said basic position.

4. A device as claimed in claim 1, wherein said transfer element means are arranged in pairs and associated with each other by synchronising means.

5. A device as claimed in claim 2, wherein said transfer element means are arranged in pairs and associated with each other by synchronising means.

6. A device as claimed in claim 3, wherein said transfer element means are arranged in pairs and associated with each other by synchronising means.

7. A device as claimed in claim 1, wherein said transfer element means are arranged in pairs with their facing surfaces forming a v-shaped passage.

8. A device as claimed in claim 2, wherein said transfer element means are arranged in pairs with their facing surfaces forming a v-shaped passage.

9. A device as claimed in claim 3, wherein said transfer element means are arranged in pairs with their facing surfaces forming a v-shaped passage.

* * * * *